United States Patent
Rauch (10) Patent No.: US 6,243,510 B1
(45) Date of Patent: Jun. 5, 2001

(54) ELECTRONICALLY-CONTROLLABLE FIBER OPTIC PATCH PANEL

(75) Inventor: Richard B. Rauch, Lake Oswego, OR (US)

(73) Assignee: Apcon, Inc., Portland, OR (US)

( * ) Notice: Subject to any disclaimer, the term of this patent is extended or adjusted under 35 U.S.C. 154(b) by 0 days.

(21) Appl. No.: 09/611,794

(22) Filed: Jul. 7, 2000

Related U.S. Application Data (60) Provisional application No. 60/189,006, filed on Mar. 13, 2000.

(51) Int. Cl.[7] .................................................. G02B 6/26
(52) U.S. Cl. ................................. 385/15; 385/17; 385/20; 385/24; 359/128; 359/154
(58) Field of Search .................................. 385/15, 16, 17, 385/20, 89, 24, 135; 359/128, 139, 154; 370/354, 397

(56) References Cited

U.S. PATENT DOCUMENTS

| | | | |
|---|---|---|---|
| 4,449,247 | 5/1984 | Waschka, Jr. ............................... | 455/9 |
| 4,451,916 | 5/1984 | Casper et al. ............................ | 370/16 |
| 4,641,378 | 2/1987 | McConnell et al. .................. | 455/619 |
| 4,825,435 | 4/1989 | Amundsen et al. .................... | 370/97 |
| 4,837,856 | 6/1989 | Glista, Jr. ............................... | 455/601 |
| 5,020,152 | 5/1991 | Glista, Jr. ............................... | 455/601 |
| 5,173,896 | 12/1992 | Dariano ..................................... | 370/13 |
| 5,204,921 | * 4/1993 | Kanai et al. ............................ | 385/17 |
| 5,226,120 | 7/1993 | Brown et al. ......................... | 395/200 |
| 5,228,105 | 7/1993 | Glista ....................................... | 385/89 |
| 5,229,875 | 7/1993 | Glista ....................................... | 359/110 |
| 5,231,565 | 7/1993 | Bilas et al. ............................. | 364/140 |
| 5,233,511 | 8/1993 | Bilas et al. ............................. | 364/146 |
| 5,249,115 | 9/1993 | Reid ......................................... | 364/141 |
| 5,253,159 | 10/1993 | Bilas et al. ............................. | 364/140 |
| 5,410,535 | 4/1995 | Yang et al. ............................. | 370/13 |
| 5,673,395 | 9/1997 | Kawakita ........................ | 395/200.21 |
| 6,002,331 | 12/1999 | Laor ....................................... | 340/539 |

OTHER PUBLICATIONS

Bypass Switch Product Specification of Molex Incorporated. No date.

* cited by examiner

*Primary Examiner*—Phan T. H. Palmer
(74) *Attorney, Agent, or Firm*—Kolisch Hartwell Dickinson McCormack & Heuser (57) ABSTRACT

A system and method for connecting an optical input to one or more selected optical outputs. The system includes at least one optical input port, and at least one optical receiver coupled to receive an optical signal via the optical input port. The optical receiver is configured to convert the optical signal into a corresponding electrical signal. The system also includes a plurality of optical output ports, and a plurality of optical transmitters. Each optical transmitter is coupled to a different one of the optical output ports, and is configured to selectively receive the corresponding electrical signal and convert it back to the optical signal for transmission through the optical output port. The system further includes electronic circuitry which is controllable to form an electrical path to convey the corresponding electrical signal from the optical receiver to the optical transmitter coupled to a selected optical output port. As a result, the optical signal received via the optical input port is transmitted through the selected optical output port. Optionally, the system may be configured to receive control instructions via a computer network so that an operator may select the optical output port from a remote location.

30 Claims, 7 Drawing Sheets

ELECTRONICALLY-CONTROLLABLE FIBER OPTIC PATCH PANEL

CROSS-REFERENCE TO RELATED APPLICATIONS

This application claims priority to U.S. Provisional Patent Application Serial No. 60/189,006, entitled ELECTRONIC FIBER OPTIC PATCH PANEL, which was filed on Mar. 13, 2000.

FIELD OF THE INVENTION

The present invention relates generally to fiber optic communications, and more particularly to a system for electronically connecting fiber optic communication lines.

BACKGROUND

As computer processing speeds have increased, the need for high-speed computer networks have also increased. While prior computer communications systems have relied almost exclusively on various types of electrical lines to transmit information (e.g., copper, coaxial cable, twisted-pair, etc.), many newer systems incorporate fiber optic lines to accommodate the heaviest communication traffic. Fiber optic lines are capable of transmitting information at much higher rates than traditional electrical lines due to the larger bandwidth of optical fibers.

Several different standardized communications protocols have been adopted to allow computer network communications over fiber optic lines. For example, the ANSI X3.230-1994 standards (referred to herein as Fibre Channel) define a 1.0625 Gigabit per second (Gbps) communications protocol for both single mode and multimode fiber optics communications. Similarly, the IEEE 802.3x standards (referred to herein as "Gigabit Ethernet") define a 1.25 Gbps fiber optics communications protocol which is partly based on the Fibre Channel protocol. These protocols specify a variety of different parameters such as how information is divided into packets for transmission and then reassembled after delivery, and how information is addressed to reach its intended destination. In addition to computer networks, other technologies such as telecommunications and high definition television (HDTV) also utilize fiber optic communications.

A disadvantage of fiber optic lines as compared to electrical lines is the difficulty in routing fiber optic communications to a selected destination. Although information communicated over a computer network can be routed by network components such as switches, routers, bridges, hubs, etc., (referred to collectively herein as "signal routing devices"), these devices rely on software to decode the destination address of the information and then forward the information along the appropriate network path. This software process requires a substantial amount of computer processing capacity to route the information without significantly delaying the transmission.

Alternatively, fiber optic lines may be physically connected to allow the optical signal to pass directly from one line to the other. However, as is known to those of skill in the art, the optical fibers must be precisely aligned to ensure a reliable connection. One device often used to connect fiber optic cables is a manual patch panel. Typically, a manual patch panel receives several fiber optic cables extending from various different devices adapted to communicate with one another by optical signals. To enable a first device to communicate with a second device, an operator connects a fiber optic patch cable between the fiber optic cable of the first device and the fiber optic cable of the second device.

Since the manual patch panel does not decode the destination address of the information, it requires little or no computer processing capacity. However, using the patch panel to switch communications between different devices is impractical if carried out with even moderate frequency. For example, to allow the first device discussed above to communicate with a third device, the operator must disconnect the patch cable from the fiber optic cable of the second device and connect it to the fiber optic cable of the third device. Typically, the new connection must be tested for proper alignment, signal transmission, etc. In addition to being labor-intensive, this manual process can also lead to damage of the fiber optic cables. Furthermore, the manual patch panel must be placed in a location that is easily accessible by the operator.

SUMMARY

The present invention provides a system and method for connecting an optical input to one or more selected optical outputs. The system includes at least one optical input port, and at least one optical receiver coupled to receive an optical signal via the optical input port. The optical receiver is configured to convert the optical signal into a corresponding electrical signal. The system also includes a plurality of optical output ports, and a plurality of optical transmitters. Each optical transmitter is coupled to a different one of the optical output ports, and is configured to selectively receive the corresponding electrical signal and convert it back to the optical signal for transmission through the optical output port. The system further includes electronic circuitry which is controllable to form an electrical path to convey the corresponding electrical signal from the optical receiver to the optical transmitter coupled to a selected optical output port. As a result, the optical signal received via the optical input port is transmitted through the selected optical output port. Optionally, the system may be configured to receive control instructions via a computer network so that an operator may select the optical output port from a remote location.

DETAILED DESCRIPTION

Figure 1:
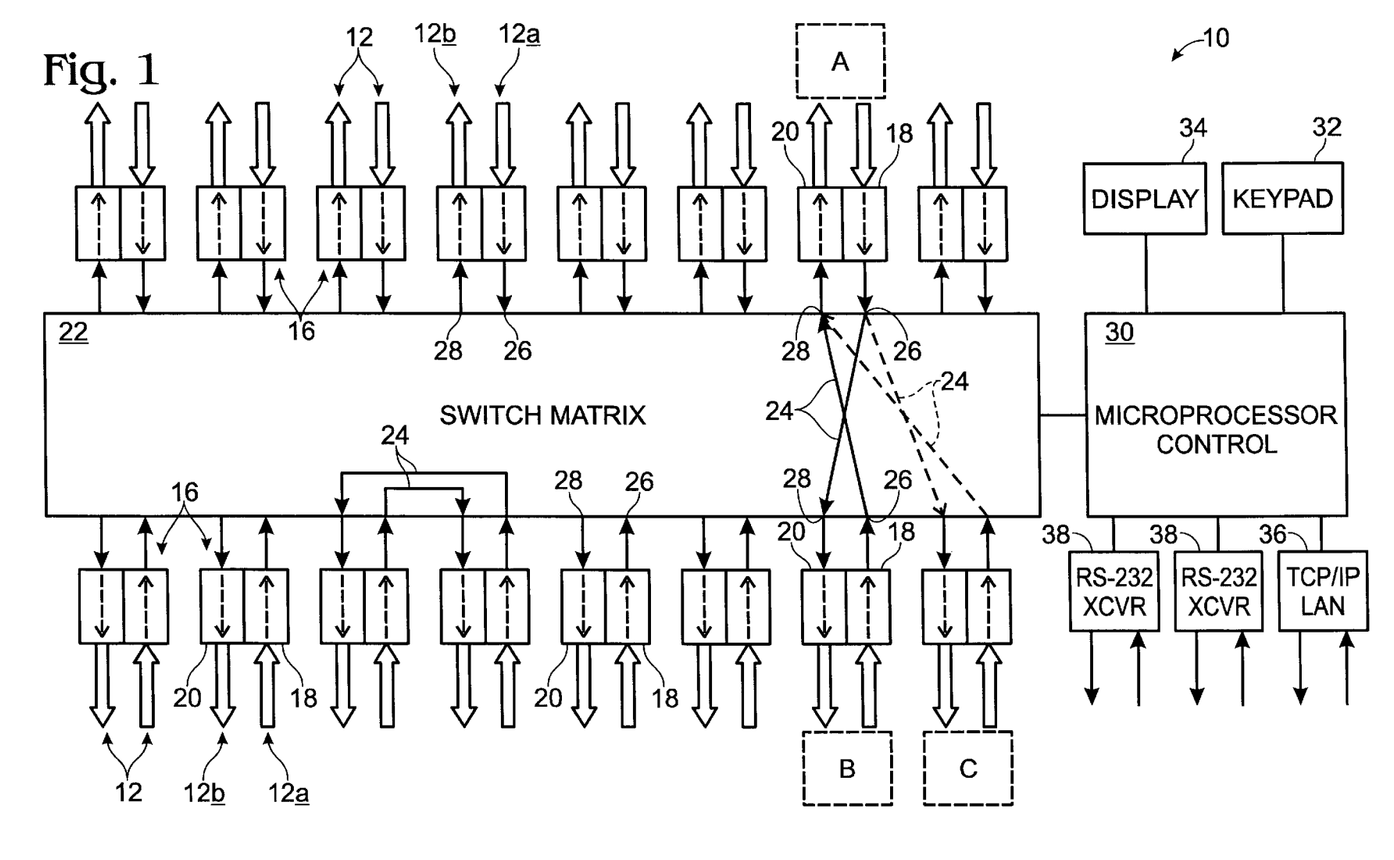
FIG. 1 is a functional block diagram of an electronic fiber optic patch panel according to the present invention.
Figure 2:
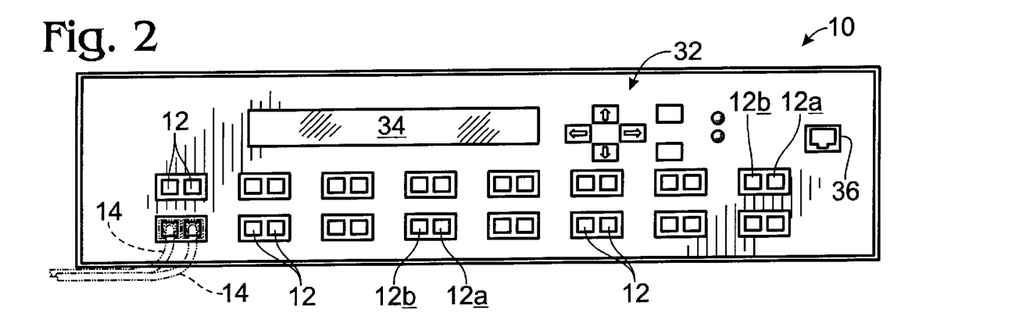
FIG. 2 is a schematic view of the front panel of an electronic fiber optic patch panel according to the present invention.

An exemplary system for selectively connecting a variety of optical data paths according to the present invention is indicated generally at 10 in FIGS. 1 and 2. System 10 includes a plurality of optical ports 12 adapted to transmit and receive optical data signals. System 10 is electrically controllable to transmit optical data signals between selected optical ports by forming an electrical data between the selected optical ports. System 10 converts incoming optical signals into corresponding electrical signals, conveys the electrical signal via the electrical data path, and then converts the corresponding electrical data signal back to the optical data signal. System 10 is also configured to receive switching instructions via a computer network so that the connection of optical data paths may be controlled from a remote location.

System 10 may be configured to transmit any type of optical signal regardless of the content of the signal. System 10 transmits optical data signals without decoding, interpreting or changing the information contained in the signals. Thus, an outgoing optical data signal contains the same formatting (if any) that was present in the incoming optical data signal. Unlike signal routing devices, system 10 is compatible with all communications protocols because system 10 transmits data signals independent of the protocols. In the exemplary embodiments described herein, system 10 is depicted as connecting components of a computer network. However, it will be appreciated that system 10 may be used in other applications including HDTV and telecommunications, etc.

As used herein, the term "communications protocol" refers to all data formatting requirements implemented by two devices in communication, including packet size, addressing, error-checking, data flow-control, etc. The term "communications protocol" does not include standard optical signal transmission parameters such as signal wavelength, amplitude, maximum transmission distances, cable connectors, etc., which are sometimes referred to by those of skill in the art as "Physical Layer" specifications. It will be appreciated that system 10 may be configured to be compatible with the Physical Layer specifications of any particular application. For example, one embodiment of system 10 may be configured to receive and transmit multimode fiber optic signals at a wavelength of 850-nanometers (nm), while another embodiment of system 10 may be configured to receive and transmit single mode fiber optic signals at a wavelength of 1300-nm.

In the exemplary embodiment depicted in FIGS. 1 and 2, system 10 has thirty-two optical ports including sixteen optical input ports 12a and sixteen optical output ports 12b. The ports are arranged into 16 pairs, each including an optical input port 12a and an optical output port 12b. In other embodiments, system 10 may have 16 ports arranged into 8 pairs, or 64 ports arranged into 32 pairs. Alternatively, system 10 may include any desired number of optical ports or pairs of optical ports.

Typically, though not necessarily, devices configured to communicate via fiber optics are connected to system 10 by a pair of fiber optic cables 14. One of cables 14 is connected between an optical output of the device and input port 12a, to convey optical signals from the device to system 10. The other one of cables 14 is connected between an optical input of the device and output port 12b, to convey optical signals from system 10 to the device. Alternatively, a single cable may include two optical fibers, one for transmitting data in each direction. As a further alternative, a particular device may be connected by only a single fiber optic cable to send signals to, or receive signals from, system 10. As a further alternative, the input and output of a particular device may be connected to ports 12 which are not arranged in a pair. In any event, ports 12 typically include suitable connectors (e.g., SC-type, ST-type, etc.) adapted to receive cables 14.

In the exemplary embodiment, each pair of ports 12 is connected to a fiber optic transceiver 16. Transceivers 16 may be any of a variety of suitable fiber optic transceivers, such as are known to those of skill in the art. As one example, fiber optic transceivers suitable for a variety of different applications are available from Infineon Technologies AG, of San Jose, Calif.

Each transceiver 16 includes a receiver portion 18 and a transmitter portion 20. Receiver portions 18 are associated with input ports 12a and configured to receive optical data signals via the input ports. The receiver portions are adapted to convert the optical signals into corresponding electrical data signals containing the same information as contained in the optical signals. Similarly, transmitter portions 20 are associated with output ports 12b and configured to transmit optical data signals via the output ports. The transmitter portions are adapted to receive an electrical signal and convert it to a corresponding optical data signal for transmission via the output port. The corresponding optical signal contains the same information as contained in the electrical signal.

System 10 also includes electronic circuitry such as switch matrix 22 which is configured to form an electrical data path or connection 24 between one or more selected optical receivers 18 and one or more selected optical transmitters 20. Switch matrix 22 includes a plurality of electrical inputs 26 and a plurality of electrical outputs 28. Each electrical input 26 is connected to receive electrical signals from an optical receiver 18, while each electrical output 28 is connected to transmit electrical signals to an optical transmitter 20.

Switch matrix 22 is controllable to selectively form (and eliminate) an electrical connection between any electrical input 26 and any electrical output 28. Preferably, the switch matrix is configured to selectively form a plurality of simultaneous connections, each between a different input and a different output. In alternative embodiments, switch matrix 22 may be configured to form a connection between a single input 26 and plural outputs 28 so that electrical signals received by the input are transmitted to each of the plural outputs. In any event, when a connection is formed between a particular electrical input and a particular electrical output, electrical data signals received at the electrical input are conveyed to the electrical output without modification. As a result, system 10 allows one device connected to the system to communicate with any other device connected to the system via optical data signals.

For example, device "A" and device "B" are shown connected together in FIG. 1. Each device has a fiber optic output connected to a corresponding input port 12a, and a fiber optic input connected to a corresponding output port 12b. Optical signals from device "A" are received by a receiver portion 18 and converted into corresponding electrical signals. The electrical signal is passed to an electrical input 26 which corresponds to device "A". Connection 24 (solid line), which is formed by switch matrix 22, conveys the electrical signal from the electrical input corresponding to device "A" to an electrical output 28 corresponding to device "B". The electrical signal is then passed to a transmitter portion 20, where it is converted back to the optical signal and transmitted through the fiber optic output port 12b connected to device "B". Thus, optical signals transmitted from the fiber optic output of device "A" are received at the fiber optic input of device "B". In a similar fashion, optical signals transmitted from the fiber optic output of device "B" are received at the fiber optic input of device "A".

Furthermore, system 10 allows the fiber optic connection of device "A" to be selectively switched from device "B" to device "C" without manually disconnecting and reconnecting the fiber optic cables. Instead, switch matrix 22 is controlled to eliminate connections 24 (solid line) between the electrical inputs and outputs associated with devices "A" and "B", and to form connections 24 (dashed lines) between the electrical inputs and outputs associated with devices "A" and "C". Device "B" may then be switched to communicate with another device connected to system 10, or the fiber optic cables from device "B" may be terminated at system 10.

It will be appreciated that switch matrix 22 may be any type of circuitry suitable for forming electrical data paths between selected electrical inputs and selected electrical outputs. Such circuitry and/or techniques for its design are known to those of skill in the art. One example of a suitable switch matrix is the AD8150 Digital Crosspoint Switch available from Analog Devices, Inc. of Norwood, Mass.

In the exemplary embodiment, system 10 also includes a controller 30 coupled to switch matrix 22. The switch matrix is adapted to be controlled by the controller to selectively form and remove electrical connections 24. Controller 30 may be any suitable controller adapted to control switch matrix 22. In the exemplary embodiment, controller 30 includes a microprocessor (such as is known to those of skill in the art) and software executable by the microprocessor to control the switch matrix. It will be appreciated that while the exemplary embodiment is depicted and described as having a single switch matrix, system 10 may alternatively include a plurality of switch matrixes to accommodate additional fiber optic ports. For example, two switch matrixes, each having sixteen electrical inputs and sixteen electrical outputs, may be combined in a single system to provide an electronic fiber optic patch panel having thirty-two pairs of optical input/output ports. In addition to controlling switch matrix 22, controller 30 may be configured to perform additional functions such as monitoring temperature within the system, monitoring system usage, etc.

Controller 30 may be configured to control the switch matrix based on programmed criteria and/or based on external inputs. In the exemplary embodiment, system 10 includes one or more control panels, such as keypad 32, which are connected to controller 30. A user/operator may use keypad 32 to input instructions to controller 30 selecting the optical polls that should be connected. System 10 may also include a display 34 connected to controller 30. Display 34 is adapted to display which ports are connected together, programming menus, error messages, etc.

In addition to receiving instructions from a local device such as keypad 32, controller 30 may also be configured to receive instructions from a remote location. For example, system 10 may include one or more communications modules connected to controller 30 and adapted to receive control instructions via a computer network. In the exemplary embodiment, system 10 includes a Local Area Network (LAN) module 36 and dual RS-232 modules 38. LAN module 36 includes a suitable network interface card and is adapted to communicate via a computer network (e.g., Ethernet, etc.) using standard communications protocols such as TCP/IP. Similarly, RS-232 modules 38 include suitable communications transceivers and are adapted to communicate via the RS-232 protocol over a serial network.

System 10 is adapted to receive control instructions via any one of modules 36 and 38. Alternatively, the different modules may be connected to different remote devices so that system 10 can be controlled from multiple remote locations. Controller 30 is configured to carry out the control instructions by selecting and/or changing the connections of optical ports 12, reporting system information such as errors and alarms, etc. As will be described in more detail below, a remote administrator device may be provided to transmit control instructions to system 10 via a computer network such as a LAN, intranet, extranet, etc. The remote administrator device may include software adapted to provide a graphical user-interface to an operator of the administrator device. Alternatively, a different user-interface may be provided. The user-interface typically allows the operator to select which ports should be connected, view system status, receive alarms, etc.

It will be appreciated that the ability to electronically connect and disconnect the fiber optic lines of many different devices from a remote location allows a single operator to control a widely-distributed fiber optic network without having physical access to the network. Additionally, the dual RS-232 modules allow multiple patch panels to be connected in a daisy chain configuration and controlled from a single device connected to one of the multiple patch panels. In such a configuration, each patch panel is assigned a unique address. Instructions from the administrator device are passed from one patch panel to another, but ignored by all but the addressed patch panel. Thus, multiple patch panels may be grouped and controlled together to provide interconnections for large numbers of fiber optic communication devices.

As described above, the present invention provides a method of selectively connecting any of plural optical data paths without physically connecting and disconnecting the optical data paths. The method, indicated generally at 100 in FIG. 3, includes selecting a first optical data path from a plurality of optical data paths, at step 110, and selecting a second optical data path from the plurality of optical data paths, at step 120. An electrical data path is then formed between the first and second optical data paths, as indicated at step 130.

Figure 3:
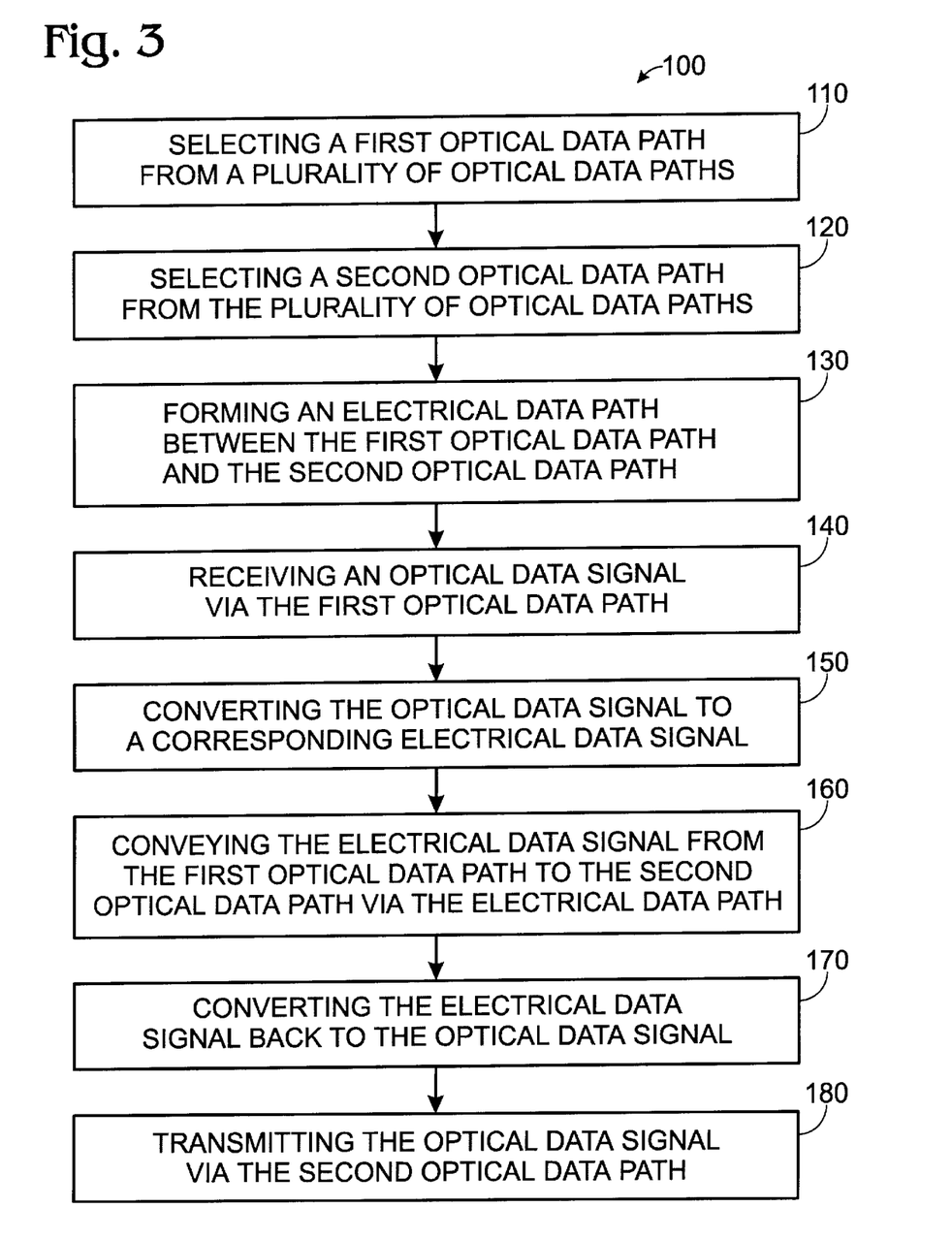
FIG. 3 is a flowchart illustrating a method of selectively connecting optical data paths according to the present invention.

After the electrical data path has been formed, an optical data signal may be received via the first optical data path, at step 140, and converted to a corresponding electrical data signal, at step 150. The electrical data signal is then conveyed from the first optical data path to the second optical data path via the electrical data path, as indicated at step 160, whereupon the electrical data signal is converted back to the optical data signal, as indicated at step 170. Finally, the optical data signal is transmitted via the second optical data path, as indicated at step 180.

Method 100 is different than the operation of signal routing devices because the method includes forming an electrical data path (step 130). Once the electrical data path is formed, all signals received from the first optical data path are transmitted via the second optical data path for as long as the electrical data path is maintained. In contrast, signal routing devices maintain permanent electrical connections to all destination devices, and merely route data along one of the permanent connections. Furthermore, in some embodiments the optical data signal may include one or more destination addresses specifying a particular device. Signal routing devices operate by determining the destination address and then transmitting the signal along one or more existing connections toward the destination device. In contrast, method 100 may be used to direct signals toward a destination device without determining the destination addresses because the signal is routed without reference to any destination address. In fact, method 100 typically includes forming the electrical data path based on an operator's control inputs before the optical signal is even received. Thus it would be impossible to form the electrical data path based on a destination address. In addition, signal routing devices often must modify the incoming signal by changing one or more of the destination addresses. However, method 100 does not require modification of the received signal.

Figure 4:
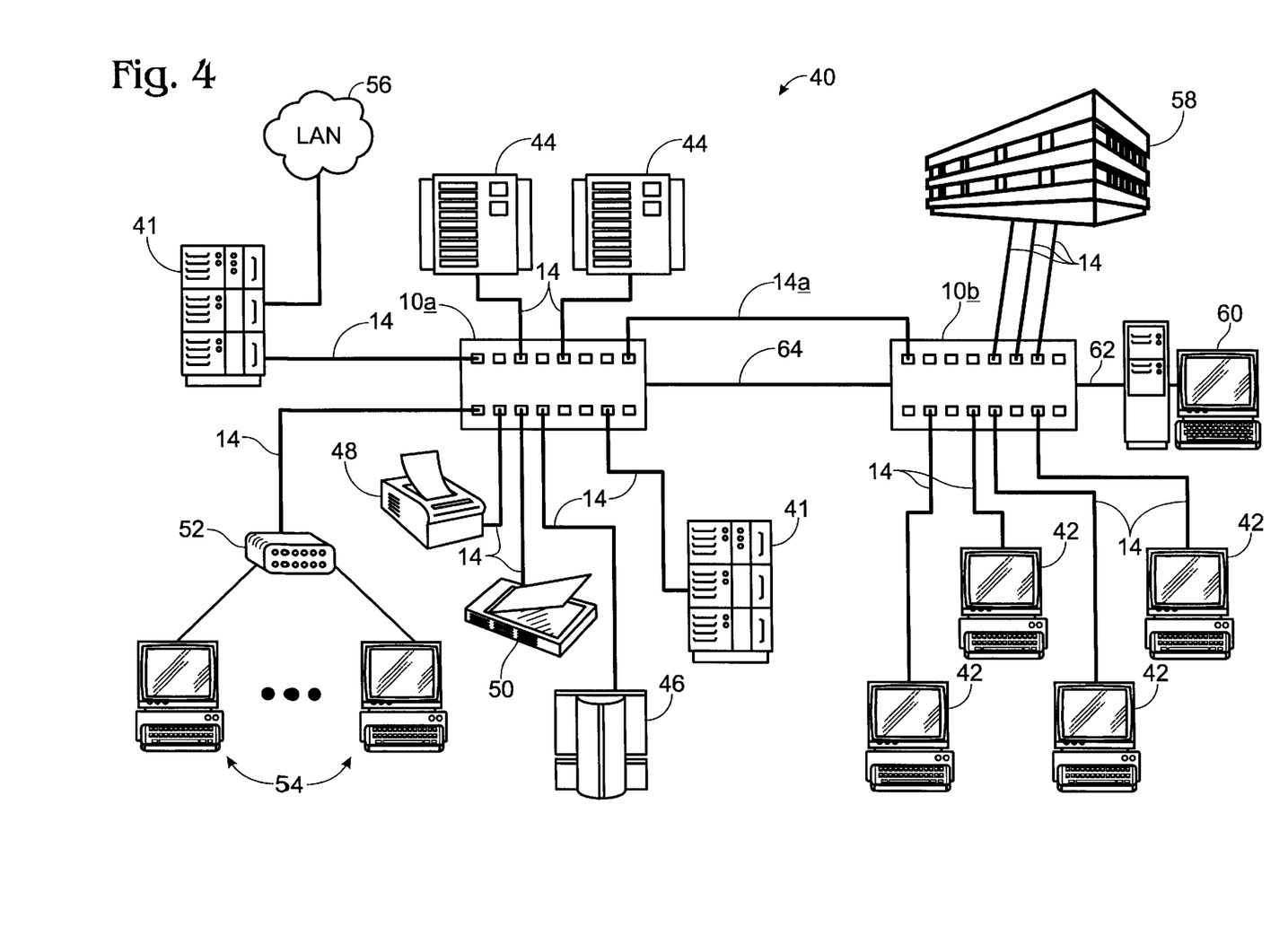
FIG. 4 is a schematic diagram showing a variety of computer network components connected by a plurality of electronic fiber optic patch panels according to the present invention.

Those of skill in the art will appreciate that the present invention allows the connections between computer network devices to be dynamically controlled, thereby reducing the number of signal routing devices needed in a network, and preventing the congestion which can occur in such devices. FIG. 4 shows an exemplary computer network 40 including multiple network components of varying types connected to communicate via two electronically-controllable fiber optic patch panels 10a and 10b. Alternatively, network 40 may include any number of patch panels. It will be understood that network 40 is provided to illustrate, rather than limit, the applications for which the invention may be used.

As shown in FIG. 4, network 40 may include any suitable component adapted to communicate via fiber optic communications. A few examples of suitable components are servers 41, workstations 42, memory storage devices such as tape backups 44 and CD-ROM libraries 46, and input/output devices such as printers 48 and scanners 50. In addition, signal routing devices 52 may be connected to the patch panel to allow communications between the components and remote devices 54. The remote devices may communicate with signal routing device 52 using either optical or electrical data signals. Selected components such as servers 41 may also be connected to external networks 56. Further, fiber optic connections may be made to components or other patch panels in remote facilities 58. Although the components are shown connected to the patch panels by a single cable, it will be understood that the cables will typically be dual cables or single cables with dual fibers.

As also shown in FIG. 4, multiple patch panels may be linked together by connecting fiber optic cables 14a between one or more optical ports on patch panel 10a and one or more optical ports on patch panel 10b. Thus, optical signals received at a port on patch panel 10a may be transmitted to a port on patch panel 10b, and vice versa. For example, a workstation 42 connected to patch panel 10b can be connected to communicate with a server 41 connected to patch panel 10a. Furthermore, both patch panels may be controlled from single administrator device 60, or multiple administrator devices may be used. In the exemplary embodiment depicted in FIG. 4, administrator device 60 is connected directly to patch panel 10b by cable 62, which may be a LAN cable, RS-232 cable, etc. Patch panel 10a is connected to patch panel 10b through an RS-232 or other suitable cable 64 as described above. Patch panel 10a communicates with the administrator device through patch panel 10b. The administrator device controls patch panel 10a by transmitting control instructions to patch panel 10b, which then forwards the instructions to patch panel 10a.

It will be appreciated by those of skill in the art that patch panel 10 may also be used to extend the distance over which optical data signals are transmitted. Since optical data signals transmitted over optical fibers will degrade with distance due to signal attenuation, dispersion, etc., most communications protocols specify maximum transmission distances. However, the incoming optical signals are regenerated in patch panel 10 before being forwarded to a destination device. Thus, for example, if the maximum transmission distance for a particular communications protocol is 500-meters, then two devices which are separated by 800-meters may nevertheless communicate if connected together through a patch panel that is located within 500-meters of each device. Similarly, in network 40 shown in FIG. 4, patch panels 10a and 10b may be separated by the maximum transmission distance, thereby allowing components to communicate which are separated by up to three times the maximum transmission distance. It will be appreciated that if cable 64 is not adapted to extend the maximum transmission distance of the fiber optic cable 14a, then the patch panels may be controlled separately by local administrator devices and/or by keypad entries.

Figure 5:
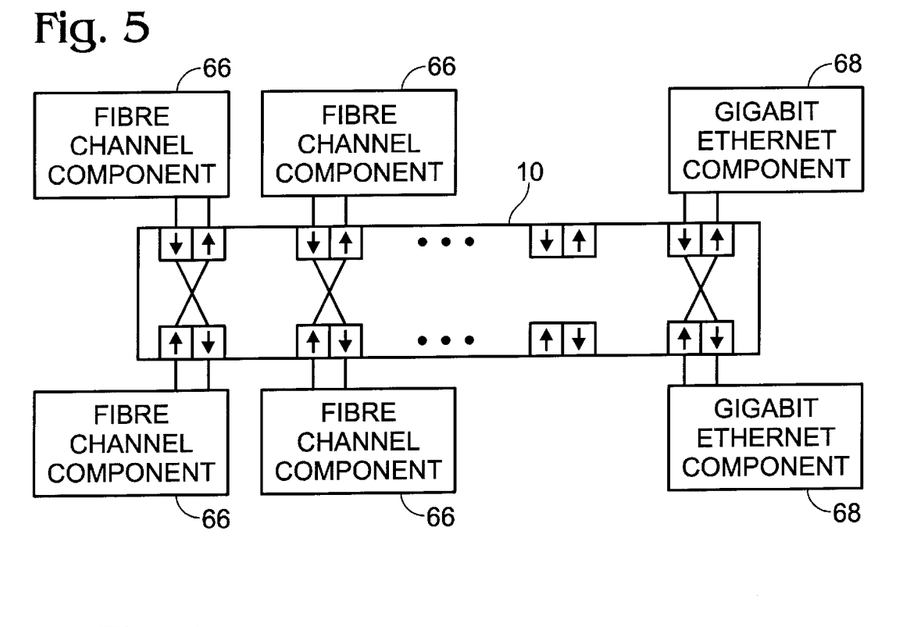
FIG. 5 is a schematic diagram showing the use of an electronic fiber optic patch panel according to the present invention to connect different types of computer network components.

FIG. 5 illustrates a further aspect of the invention. As described above, system 10 conveys optical data signals between selected data paths without decoding or modifying the data, and therefore functions independently of any communications protocol the data signal may include. As a result, system 10 may be used to convey signals between devices which communicate using any communications protocol. Furthermore, system 10 may simultaneously transmit a plurality of data signals each embodying a different protocol. In the embodiment shown in FIG. 5, patch panel 10 is connected to a plurality of components 66 configured to communicate using the Fibre Channel communications protocol, as well as a plurality of components 68 configured to communicate using the Gigabit Ethernet protocol. System 10 is controlled to form connections between Fibre Channel components 66, and to form connections between Gigabit Ethernet components 68. Alternatively, components configured to communicate using other communications protocol may be connected together through system 10.

In the exemplary embodiments described, system 10 has been illustrated as forming point-to-point connections between two devices which communicate with one another. However, it will be appreciated that system 10 may be controlled to create a variety of different arrangements and architectures to enable fiber optic communications between multiple devices. As one example, system 10 may be controlled to implement a communications loop configuration such as used in the Fibre Channel-Arbitrated Loop protocol (FC-AL), which is known to those of skill in the art.

Figure 6:
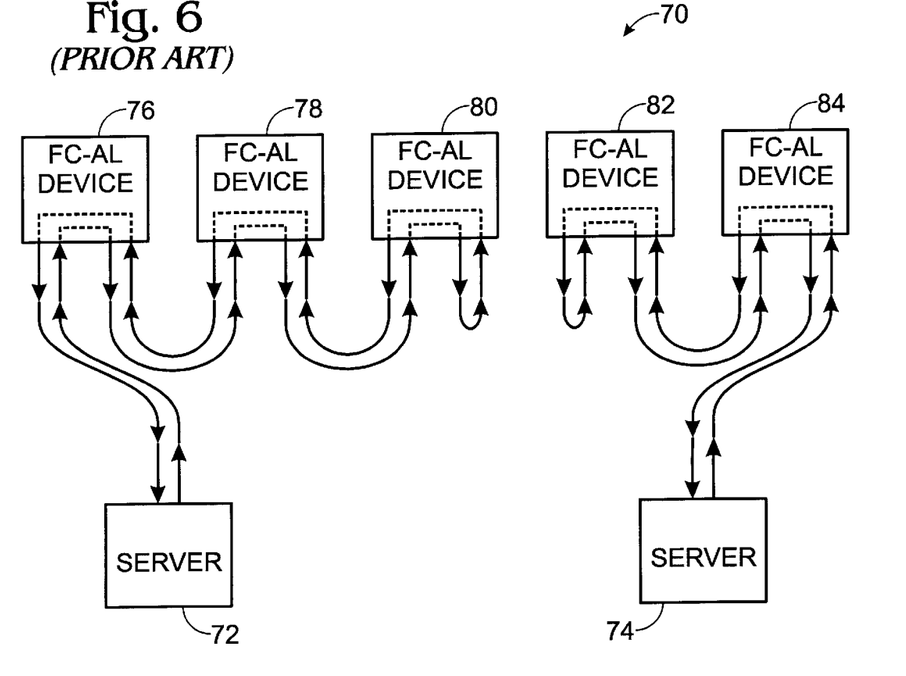
FIG. 6 is a schematic block diagram illustrating a network arranged in a prior art Fibre Channel-Arbitrated Loop configuration.

FIG. 6 illustrates an example of a network 70 arranged in a prior art FC-AL configuration. Network 70 includes a pair of servers 72, 74 adapted to communicate with one or more peripheral devices 76, 78, 80, 82, and 84 using the FC-AL communications protocol. Peripheral devices 76–84 may be any type of FC-AL device including data storage devices, input/output devices, workstations, etc.

In the embodiment depicted in FIG. 6, the servers include a single fiber optic transceiver, while peripheral devices 76–84 include dual fiber optic transceivers. The dual fiber optic transceivers allow the peripheral devices to be connected to communicate with two other FC-AL devices. As indicated by the dashed line connections within peripheral devices 76–84, the peripheral devices are configured to pass signals between the dual transceivers so that signals received at one transceiver are transmitted through the other transceiver. In alternative embodiments, the servers may include dual transceivers and/or the peripheral devices may include only one transceiver.

Network 70 includes two portions arranged in a FC-AL configuration. The first portion includes server 72 and peripheral devices 76, 78, 80, all of which are interconnected by fiber optic cables. The transceiver of server 72 is connected to one of the transceivers of peripheral device 76. The other transceiver of peripheral device 76 is connected to one of the transceivers of peripheral device 78. Similarly, the other transceiver of peripheral device 78 is connected to one of the transceivers of peripheral device 80. Finally, the other transceiver of peripheral device 80 is connected to itself so that signals transmitted by the transmitter portion are received by the receiver portion. Thus, a communications loop is formed running from server 72, to peripheral device 76, to peripheral device 78, and to peripheral device 80, then back to peripheral device 78, and to peripheral device 76, and finally returning to server 72. In accordance with the FC-AL communications protocol, server 72 communicates with peripheral device 78 through peripheral device 76, and communicates with peripheral device 80 through peripheral devices 76 and 78.

The other portion of network 70 that is arranged in a FC-AL configuration includes server 74, peripheral device 82 and peripheral device 84, all of which are interconnected by fiber optic cables. The transceiver of server 74 is connected to one of the transceivers of peripheral device 84. The other transceiver of peripheral device 84 is connected to one of the transceivers of peripheral device 82. The other transceiver of peripheral device 82 is connected to itself, thereby forming a communications loop running from server 74, to peripheral device 84, to peripheral device 82, then back to peripheral device 84, and returning to server 74. Communications between server 74 and peripheral device 82 are passed through peripheral device 84 in accordance with the FC-AL communications protocol.

Figure 7:
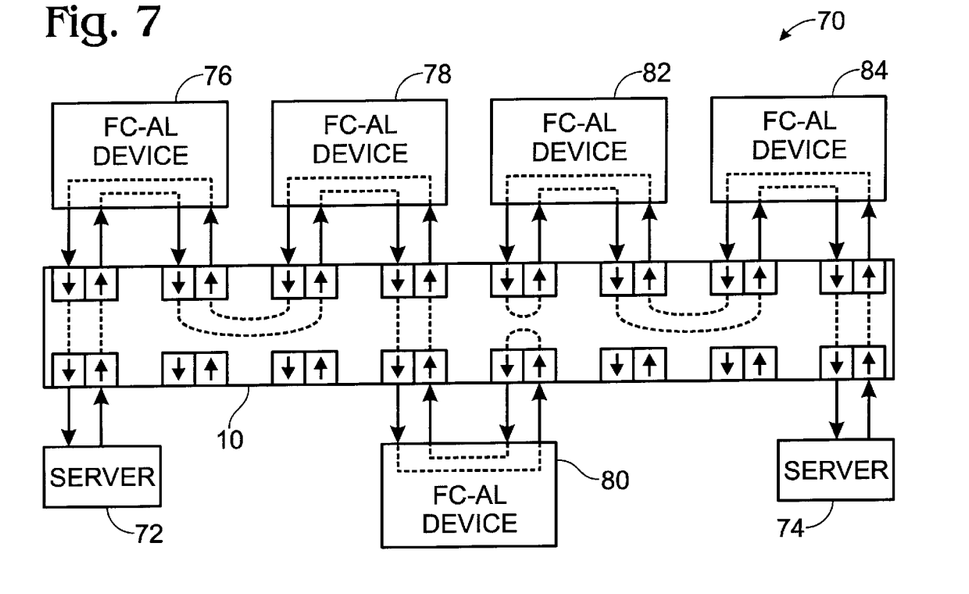
FIG. 7 is a schematic block diagram illustrating a network arranged in a Fibre Channel-Arbitrated Loop configuration according to the present invention.

Turning attention now to FIG. 7, network 70 is shown implemented through selected connections within a patch panel 10. The transceivers of servers 72 and 74 are each connected to a pair of optical input/output ports in patch panel 10 by fiber optic cables. Similarly, each transceiver in peripheral devices 76–84 is connected to a pair of optical input/output ports in the patch panel by the fiber optic cables. Once the servers and peripheral devices are connected to the patch panel, the patch panel may be electronically controlled to connect the components in a desired FC-AL configuration. In the embodiment shown in FIG. 7, the components are arranged in configurations which are functionally identical to those of FIG. 6. Server 72 is connected in an FC-AL configuration with peripheral devices 76, 78 and 80, while server 74 is connected in an FC-AL configuration with peripheral devices 82 and 84. It will be noted that peripheral devices 80 and 82 are each connected to a pair of optical input/output ports which are connected in a loop so that signals received by the input port are transmitted through the output port.

Figure 8:
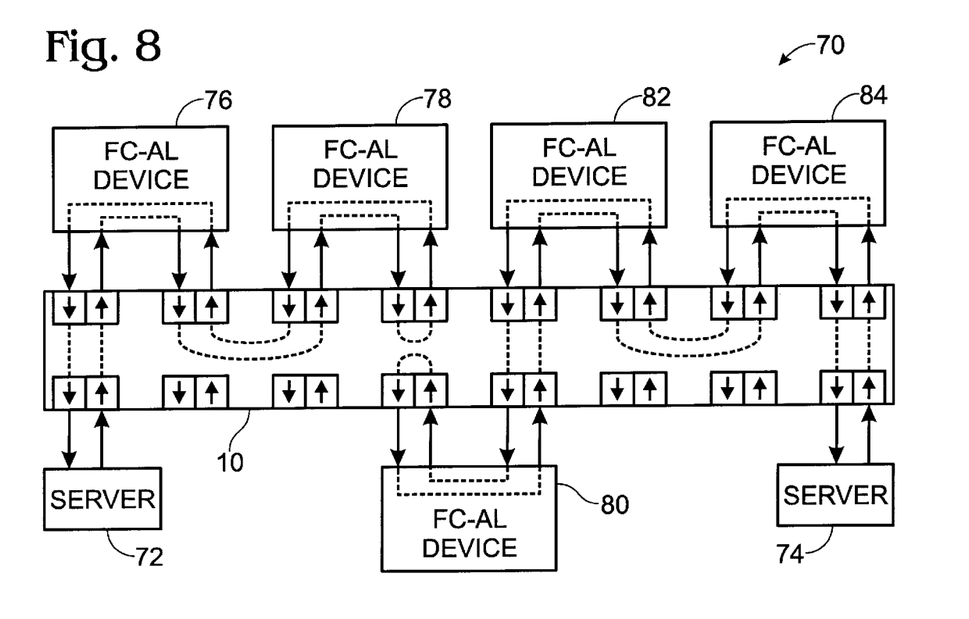
FIG. 8 is a schematic block diagram illustrating the network configuration of FIG. 7, but showing one peripheral device switched from a first portion of the network to a second portion of the network.

Connecting components in a FC-AL configuration through use of patch panel 10 allows an operator to quickly and easily reconfigure the components without manually connecting and disconnecting the fiber optic cables. As shown in FIG. 8, for example, peripheral device 80 may be switched from the communications loop that includes server 72 to the communications loop that includes server 74 by controlling the patch panel to disconnect peripheral device 80 from peripheral device 78, and connecting peripheral device 80 to peripheral device 82. Alternatively, peripheral device 76 and/or peripheral device 78 may be switched to the communications loop that includes server 74.

In the exemplary embodiments depicted in FIGS. 7 and 8, the receiver portion and transmitter portion of a particular transceiver on the patch panel were connected by electrical data paths to the receiver portion and transmitter portion of another transceiver on the patch panel to form the FC-AL configurations. This configuration allows data signals to flow through each component in both directions simultaneously, and is hereinafter referred to as the "dual path configuration."

Figure 9:
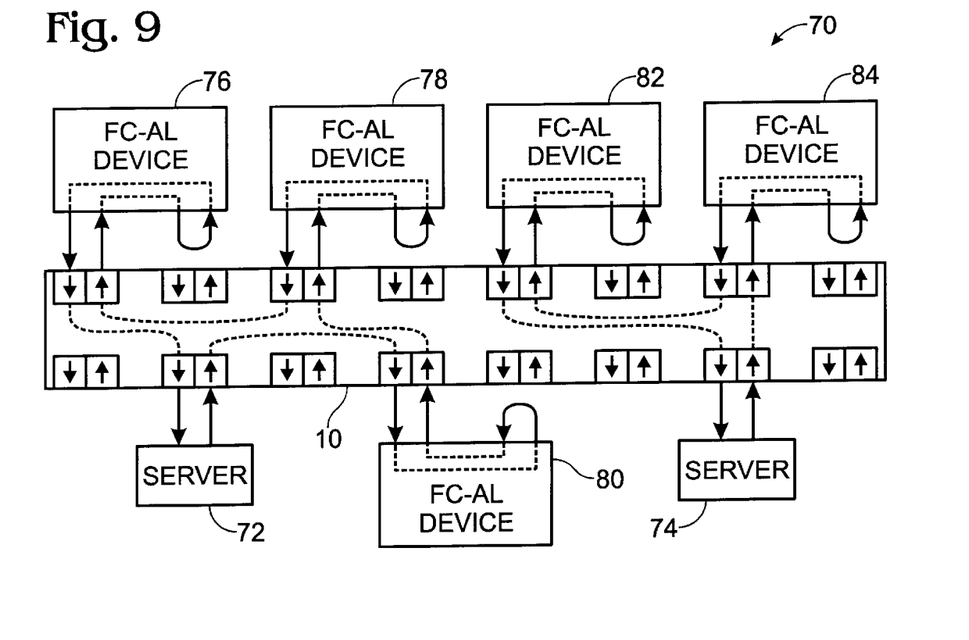
FIG. 9 is a schematic block diagram illustrating a network arranged in an alternative Fibre Channel-Arbitrated Loop configuration according to the present invention.

As described above, however, the receiver portion and transmitter portion of a particular transceiver on the patch panel may alternatively be connected to the receiver portion and transmitter portion of different transceivers on the patch panel. For example, FIG. 9 shows a configuration of network 70 that is functionally identical to the configuration shown in FIG. 7. However, in the configuration of network 70 shown in FIG. 9, the receiver and transmitter portions of the patch panel transceivers are connected to different transceivers, thereby forming a single, continuous data loop within each portion of network 70. One transceiver of each peripheral device is connected in a loop so that a signal received by the other transceiver is transmitted back out of the receiving transceiver. This configuration allows data to flow in only a single direction through each component (e.g., server 72, to peripheral device 80, to peripheral device 78, to peripheral device 76, back to server 72), and is hereinafter referred to as the "single path configuration."

Figure 10:
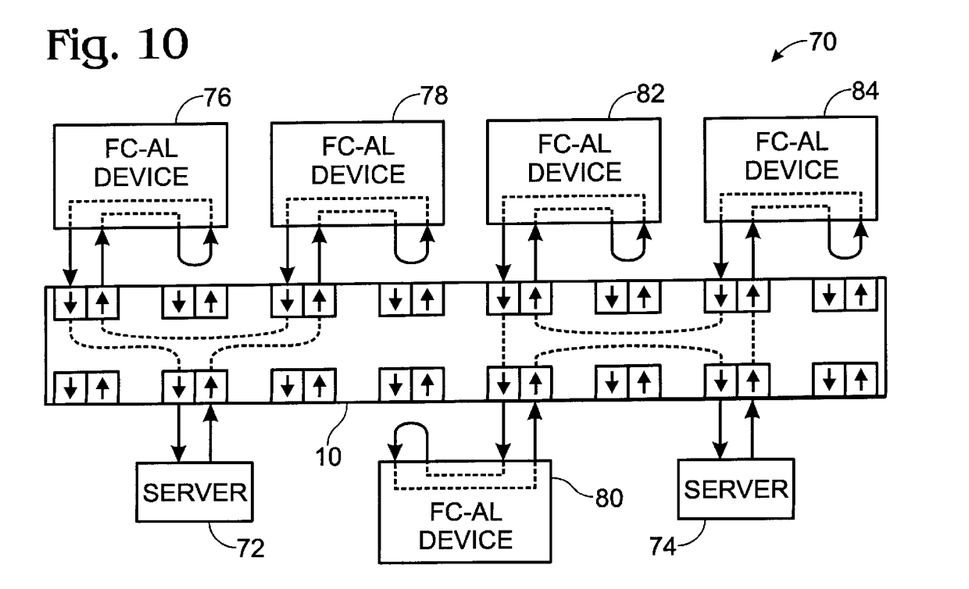
FIG. 10 is a schematic block diagram illustrating the network configuration of FIG. 9, but showing one peripheral device switched from a first portion of the network to a second portion of the network.

As with the dual path configuration, the single path configuration also allows an operator to switch the connections of peripheral devices. For example, FIG. 10 shows a single path configuration of network 70 which is similar to that in FIG. 9, except that peripheral device 80 has been switched from the communications loop that includes server 72 to the communications loop that includes server 74. Thus, the configuration of network 70 in FIG. 10 is functionally identical to that shown in FIG. 8.

One advantage of the single path configuration over the dual path configuration is increased capacity. As can be seen in FIGS. 7 and 8, the dual path configuration requires two transceivers on the patch panel for each peripheral device. However, as shown in FIGS. 9 and 10, the single path configuration requires only a single transceiver on the patch panel for each peripheral device. As a result, more peripheral devices can be connected together through a particular sized patch panel using the single path configuration rather than using the dual path configuration.

Figure 11:
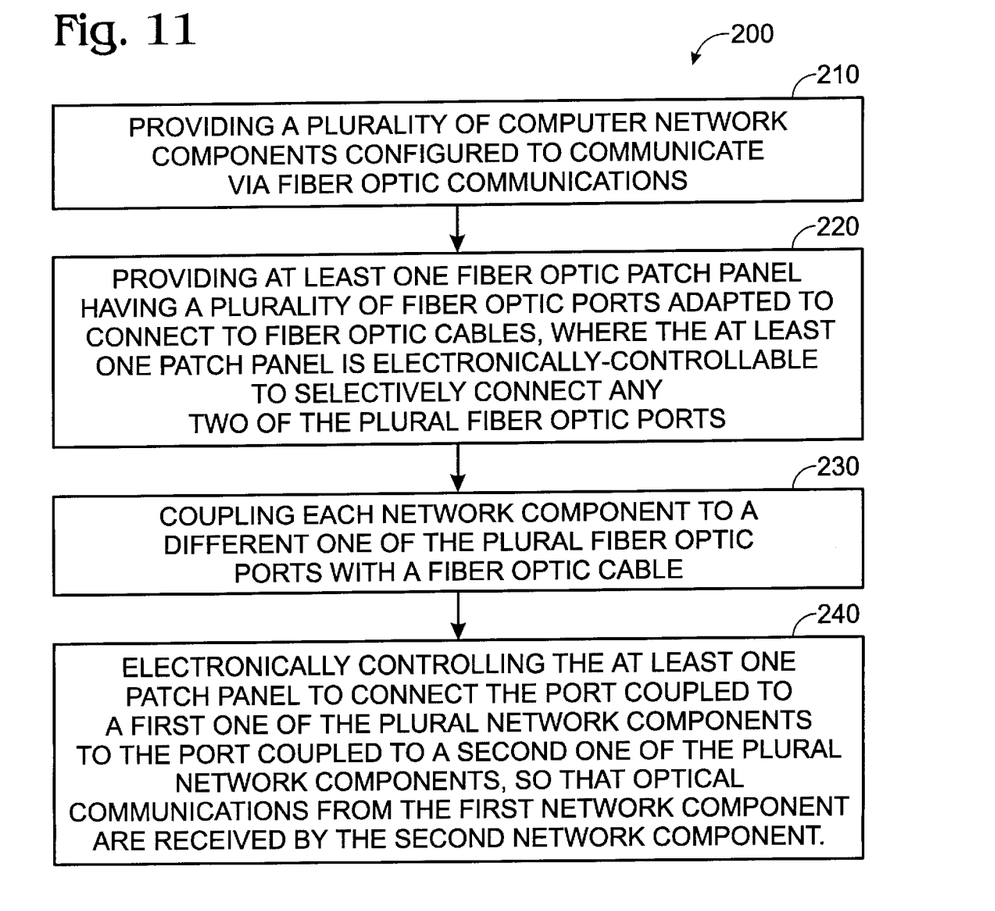
FIG. 11 is a flowchart illustrating a method of constructing a computer network according to the present invention.

In view of the exemplary embodiments described above, those of skill in the art will appreciate that the invention provides a method of constructing versatile and easily changeable fiber optic networks to enable high-speed communications between numerous network components. An exemplary method for constructing such a network is indicated generally at 200 in FIG. 11. Method 200 includes providing a plurality of computer network components configured to communicate via fiber optic communications, as indicated at step 210. Method 200 also includes providing at least one fiber optic patch panel having a plurality of fiber optic ports adapted to connect to fiber optic cables, as indicated at step 220, where the patch panel is electronically-controllable to selectively connect any two of the plural fiber optic ports. Then, coupling each network component to a different one of the plural fiber optic ports with a fiber optic cable, as indicated at step 230. Finally, electronically controlling the patch panel to connect the port coupled to a first one of the plural network components to the port coupled to a second one of the plural network components, so that optical communications from the first network component are received by the second network component, as indicated at step 240. Additional components may then be connected through the patch panel if desired, and/or existing connections may be changed.

The present invention provides a unique system and method for managing the interconnections of multiple fiber optic communications devices. The system provides an operator with complete control to establish, eliminate and change such interconnections electronically and from a single location. Furthermore, the system is independent of any communications protocols which may be in use by the multiple devices.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. An electronically-controllable fiber optic patch panel configured to replicate incoming fiber optic signals on an outgoing fiber optic line, comprising:
    a switch matrix having plural electrical inputs and plural electrical outputs;
    an electronic controller coupled to the switch matrix;
    plural pairs of optical ports, each pair including a fiber optic input and a fiber optic output; and
    plural transceivers, where each transceiver is connected to a different one of the plural pairs of optical ports and a different one of the plural electrical inputs and a different one of the plural electrical outputs, and where each transceiver includes
        a receiver portion adapted to convert optical signals received at the corresponding fiber optic input into electrical signals, and to transmit the electrical signals to the corresponding electrical input, and
        a transmitter portion adapted to convert electrical signals received from the corresponding electrical output into optical signals, and to transmit the optical signals to the corresponding fiber optic output;
    where the switch matrix is adapted to be controlled by the controller to connect a selected electrical input to one or more selected electrical outputs, so that optical signals received at the fiber optic input corresponding to the selected electical input are transmitted to the one or more fiber optic outputs corresponding to the one or more selected electrical outputs.

2. The patch panel of claim 1, where the controller is configured to receive instructions from a remote administrator device via a computer network, and to control the switch matrix in response to the instructions.

3. A method of selectively connecting optical data paths, comprising the steps of:
    selecting a first optical data path from a plurality of optical data paths;
    selecting a second optical data path from the plurality of optical data paths;
    forming an electrical data path between the first optical data path and the second optical data path;
    receiving an optical data signal via the first optical data path;
    converting the optical data signal to a corresponding electrical data signal;
    conveying the electrical data signal from the first optical data path to the second optical data path via the electrical data path;
    converting the electrical data signal back to the optical data signal; and
    transmitting the optical data signal via the second optical data path.

4. The method of claim 3, where the step of forming is performed prior to the steps of receiving the optical data signal and converting the optical data signal into the corresponding electrical data signal.

5. The method of claim 3, where the optical data signal includes at least one computer network destination address, and where the steps of selecting a second optical data path and forming an electrical data path are performed without determining the at least one computer network destination address.

6. The method of claim 3, where the optical data signal is formatted according to a particular one of plural communications protocols, and where each step is performed independent of the particular communications protocols.

7. The method of claim 3, further comprising the steps of
    selecting a third optical data path from the plurality of optical data paths,
    eliminating the electrical data path between the first optical data path and the second optical data path, and
    forming an electrical data path between the first optical data path and the third optical data path.

8. The method of claim 3, where the first optical data path includes a first fiber optic cable, and where the step of receiving includes receiving an optical data signal from a remote computer network component via the first fiber optic cable.

9. The method of claim 8, where the second optical data path includes a second fiber optic cable, and where the step of transmitting includes transmitting the optical data signal to a remote computer network component via the second fiber optic cable.

10. The method of claim 3, further comprising the step of receiving a switching instruction from a remote location via a computer network, where the instruction specifies the first and second optical data paths, and where the steps of selecting the first and second optical data paths are performed in response to the instruction.

11. The method of claim 3, where the first and second optical data paths are each connected to a switch matrix, and where the step of forming includes controlling the switch matrix to form an electrical connection between the first and second optical data paths.

12. A system for connecting an optical input to one or more selected optical outputs, comprising:

at least one optical input port;

at least one optical receiver coupled to receive an optical signal via the at least one optical input port, and configured to convert the optical signal into a corresponding electrical signal;

a plurality of optical output ports;

a plurality of optical transmitters, each coupled to a different one of the optical output ports, and each configured to selectively receive the corresponding electrical signal and convert it back to the optical signal for transmission through the optical output port;

electronic circuitry controllable to form an electrical path to convey the corresponding electrical signal from the at least one optical receiver to the optical transmitter coupled to a selected optical output port, so that the optical signal received via the at least one optical input port is transmitted through the selected optical output port.

13. The system of claim 12, where the electronic circuitry is controllable to form multiple electrical paths, where each electrical path is configured to convey the corresponding electrical signal from the at least one optical receiver to a different one of the plural optical transmitters.

14. The system of claim 12, where the electronic circuitry includes at least one switch matrix.

15. The system of claim 12, further comprising a controller coupled to control the at least one switch matrix to selectively form the one or more electrical paths.

16. The system of claim 15, where the controller is configured to receive instructions via a computer network, and to control the at least one switch matrix in response to the instructions.

17. The system of claim 15, further comprising a display connected to the controller and adapted to indicate the selected optical output port.

18. The system of claim 15, further comprising one or more control panels connected to the controller, and operable by a user to control the at least one switch matrix.

19. The system of claim 12, where the at least one optical input port includes a plurality of optical input ports, and where the at least one optical receiver includes a plurality of optical receivers each coupled to a different one of the optical input ports, and where the electronic circuitry is controllable to selectively form an electrical path to convey a corresponding electrical signal from any one of the plural optical receivers to any one of the plural optical transmitters.

20. The system of claim 12, where the plurality of optical input ports includes at least eight optical input ports, and where the plurality of optical output ports includes at least eight optical output ports.

21. The system of claim 12, where the at least one input port, the at least one receiver, the plurality of output ports, the plurality of transmitters, and the electronic circuitry are self-contained in a patch panel configuration.

22. A method of constructing a computer network, comprising:

providing a plurality of computer network components configured to communicate via fiber optic communications;

providing at least one fiber optic patch panel having a plurality of fiber optic ports adapted to connect to fiber optic cables, where the at least one patch panel is electronically-controllable to selectively connect any two of the plural fiber optic ports;

coupling each network component to a different one of the plural fiber optic ports with a fiber optic cable;

electronically controlling the at least one patch panel to connect the port coupled to a first one of the plural network components to the port coupled to a second one of the plural network components, so that optical communications from the first network component are received by the second network component.

23. The method of claim 22, where the first and second network components are configured to communicate using a first communication protocol, and where the plural network components include third and fourth network components configured to communicate using a second communication protocol different than the first communication protocol, and where the step of controlling includes controlling the at least one patch panel to connect the port coupled to the first network component to the port coupled to the second network component, and to connect the port coupled to the third network component to the port coupled to the fourth network component.

24. The method of claim 23, where the first communication protocol is Fibre Channel.

25. The method of claim 23, where the first communication protocol is Gigabit Ethernet.

26. The method of claim 22, where the at least one patch panel is configured to receive and carry out control instructions, and where the step of controlling includes transmitting one or more control instructions to the at least one patch panel from a remote administrator device.

27. The method of claim 22, where the step of providing at least one patch panel includes providing a first patch panel and a second patch panel, coupling a selected fiber optic port on the first patch panel to a selected fiber optic port on the second patch panel with a fiber optic cable, and electronically controlling the first and second patch panels so that optical communications from one of the plural network components coupled to the first patch panel may be received by one of the plural network components coupled to the second patch panel.

28. The method of claim 27, where the first and second patch panels are adapted to receive and carry out control instructions, and where the step of controlling includes transmitting one or more control instructions to at least one of the first and second patch panels from a remote administrator device.

29. The method of claim 28, where the first patch panel is adapted to forward control instructions to the second patch panel, and where the step of controlling includes controlling the second patch panel by transmitting one or more control signals to the first patch panel.

30. The method of claim 22, where at least some of the network components are configured to communicate using Fibre Channel Arbitrated Loop protocol, and where the step of controlling includes controlling the at least one patch panel to connect the at least some network components in a Fibre Channel Arbitrated Loop configuration.

* * * * *

US006243510C1

(12) EX PARTE REEXAMINATION CERTIFICATE (5592nd)
United States Patent
Rauch (10) Number: US 6,243,510 C1
(45) Certificate Issued: Oct. 31, 2006

(54) ELECTRONICALLY-CONTROLLABLE FIBER OPTIC PATCH PANEL

(75) Inventor: Richard B. Rauch, Lake Oswego, OR (US)

(73) Assignee: Apcon, Inc., Portland, OR (US)

Reexamination Request:
No. 90/006,998, Apr. 6, 2004

Reexamination Certificate for:
Patent No.: 6,243,510
Issued: Jun. 5, 2001
Appl. No.: 09/611,794
Filed: Jul. 7, 2000

Related U.S. Application Data

(60) Provisional application No. 60/189,006, filed on Mar. 13, 2000.

(51) Int. Cl.
*G02B 6/26* (2006.01)
*H04J 14/00* (2006.01)

(52) U.S. Cl. .............................. 385/15; 385/17; 385/20; 385/24; 370/354; 370/397; 398/49; 398/50; 398/51; 398/46; 398/9

(58) Field of Classification Search .................... 385/15, 385/16, 17, 20, 24, 89, 88, 92, 134, 135, 385/136; 398/45, 46, 74, 82
See application file for complete search history.

(56) References Cited

U.S. PATENT DOCUMENTS

| 4,381,881 | A |   | 5/1983  | Bell ......................... 385/16 X |
| 5,303,078 | A | * | 4/1994  | Brackett et al. ............... 398/51 |
| 6,487,171 | B1|   | 11/2002 | Honig et al. ................. 370/351 |
| 6,631,018 | B1| * | 10/2003 | Milton et al. ................. 398/59 |
| 6,647,208 | B1| * | 11/2003 | Kirby .......................... 398/45 |

OTHER PUBLICATIONS

IEEE 1984, Starlite: A Wideband Digital Switch, Alan Huang and Scott Knauer.
3Com Transcend, Jun. 1999, CoreBuilder 5000 Manager User Guide.
3Com Transcend, Jun. 1997, Core Builder 6000 Getting Started Guide.
The Epoch Group's Memorandum in Opposition to Motion for Preliminary Injunction.

* cited by examiner

*Primary Examiner*—Brian Healy (57) ABSTRACT

A system and method for connecting an optical input to one or more selected optical outputs. The system includes at least one optical input port, and at least one optical receiver coupled to receive an optical signal via the optical input port. The optical receiver is configured to convert the optical signal into a corresponding electrical signal. The system also includes a plurality of optical output ports, and a plurality of optical transmitters Each optical transmitter is coupled to a different one of the optical output ports, and is configured to selectively receive the corresponding electrical signal and convert it back to the optical signal for transmission through the optical output port. The system further includes electronic circuitry which is controllable to form an electrical path to convey the corresponding electrical signal from the optical receiver to the optical transmitter coupled to a selected optical output port. As a result, the optical signal received via the optical input port is transmitted through the selected optical output port. Optionally, the system may be configured to receive control instructions via a computer network so that an operator may select the optical output port from a remote location.

US 6,243,510 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 4, 7, 12, 16, 19 and 22 are determined to be patentable as amended.

Claims 2, 5, 6, 8–11, 13–15, 17–18, 20, 21 and 23–30, dependent on an amended claim, are determined to be patentable.

New claims 31–61 are added and determined to be patentable.

1. An electronically-controllable fiber optic patch panel configured to replicate incoming fiber optic signals on an outgoing fiber optic line, comprising:
   a switch matrix having plural electrical inputs and plural electrical outputs;
   an electronic controller coupled to the switch matrix;
   plural pairs of optical ports, each pair including a fiber optic input and a fiber optic output; and
   plural transceivers, where each transceiver is connected to a different one of the plural pairs of optical ports and a different one of the plural electrical inputs and a different one of the plural electrical outputs, and where each transceiver includes
      a receiver portion adapted to convert optical signals received at the corresponding fiber optic input into electrical signals, and to transmit the electrical signals to the corresponding electrical input, and
      a transmitter portion adapted to convert electrical signals received from the corresponding electrical output into optical signals, and to transmit the optical signals to the corresponding fiber optic output;
   where the switch matrix is adapted to be controlled by the controller to connect a selected electrical input to one or more selected electrical outputs *without determining information contained in the incoming fiber optic signal*, so that optical signals received at the fiber optic input corresponding to the selected elect*r*ical input are transmitted to the one or more fiber optic outputs corresponding to the one or more selected electrical outputs.

3. A method of selectively connecting optical data paths, comprising the steps of:
   selecting a first optical data path *coupled to an optical input port* from a plurality of optical data paths;
   selecting a second optical data path *coupled to an optical output port* from the plurality of optical data paths;
   forming an electrical data path [between] *from* the first optical data path [and] *to* the second optical data path;
   receiving an optical data signal *from the optical input port* via the first optical data path;
   converting the optical data signal to a corresponding electrical data signal *where said forming is performed prior to receiving the optical data signal and converting the optical data signal*;
   conveying the electrical data signal from the first optical data path to the second optical data path via the electrical data path;
   converting the electrical data signal back to the optical data signal; and
   transmitting the optical data signal *to the optical output port* via the second optical data path.

4. The method of claim 3, where the step of forming is performed prior to the steps of receiving the optical data signal and converting the optical data signal into the corresponding electrical data signal *independent of information contained in the optical data signal and dependent upon control instructions that are transmitted separately from the optical data signal*.

7. The method of claim 3, further comprising the steps of
   selecting a third optical data path from the plurality of optical data paths,
   eliminating the electrical data path [between] *from* the first optical data path [and] *to* the second optical data path, and
   forming an electrical data path [between] *from* the first optical data path [and] *to* the third optical data path.

12. A system for connecting an optical input to one or more selected optical outputs, comprising:
   at least one optical input port;
   at least one optical receiver coupled to receive an optical signal via the at least one optical input port, and configured to convert the optical signal into a corresponding electrical signal;
   a plurality of optical output ports;
   a plurality of optical transmitters, each coupled to a different one of the optical output ports, and each configured to selectively receive the corresponding electrical signal and convert it back to the optical signal for transmission through the optical output port;
   electronic circuitry controllable to form an electrical path to convey the corresponding electrical signal from the at least one optical receiver *coupled to the at least one optical input port* to the optical transmitter coupled to a selected optical output port, so that the optical signal received via the at least one optical input port is transmitted through the selected optical output port,
   *wherein the system is adapted to receive control instructions for forming said electrical path, where said control instructions are received by the system separately from the optical signal and corresponding electrical signal and where said control instructions are formed without decoding information in the optical signal and corresponding electrical signal.*

16. The system of claim 15, where the controller is configured to receive *said* instructions via a computer network, and to control the at least one switch matrix in response to the instructions.

19. The system of claim 12, where the at least one optical input port includes a plurality of optical input ports, and where the at least one optical receiver includes a plurality of optical receivers each coupled to a different one of the optical input ports, and where the electronic circuitry is controllable to selectively form an electrical path to convey a corresponding electrical signal from any one of the plural optical receivers to any one of the plural optical transmitters, and wherein said control instructions are formed independent of any communication protocols in the optical signal.

22. A method of constructing a computer network, comprising:

providing a plurality of computer network components configured to communicate via fiber optic communications;

providing at least one fiber optic patch panel having a plurality of fiber optic ports adapted to connect to fiber optic cables, *each port including a transceiver for converting incoming optical signals into electrical signals and outgoing electrical signals into optical signals,* where the at least one patch panel is electronically-controllable to selectively connect any two of the plural fiber optic ports;

coupling each network component to a different one of the plural fiber optic ports with a fiber optic cable;

electronically controlling *a switch matrix in* the at least one patch panel *to provide an electrical path from the transceiver of a first port to the transceiver of a second port* to connect the *first* port coupled to a first one of the plural network components to the *second* port coupled to a second one of the plural network components *independently of communications protocol of the fiber optic communications,* so that optical communications from the first network component are received by the second network component, *where control instructions for controlling the switch matrix are sent to the switch matrix separately from said optical communications and before said optical communications are received.*

31. The patch panel of claim 1, wherein the switch matrix is adapted to be controlled by the controller to connect the selected electrical input to one selected electrical output so that the fiber optic input of one pair of optical ports is connected to the fiber optic output of the same pair of optical ports.

32. The patch panel of claim 1, wherein the switch matrix is adapted to be controlled by the controller to connect two selected electrical inputs to two selected electrical outputs so that the fiber optic input of a first pair of optical ports is connected to the fiber optic output of a second pair of optical ports and the fiber optic output of the first pair of optical ports is connected to the fiber optic input of a third pair of optical ports.

33. The method of claim 3, further including the steps of:

selecting a third optical data path from the plurality of optical data paths, forming a second electrical data path from the first optical data path to the third optical data path;

conveying the electrical data signal from the first optical data path to the third optical data path via the second electrical data path;

converting the electrical data signal back to the optical data signal; and transmitting the optical data signal simultaneously via both the second optical data path and the third optical data path.

34. The method of claim 3, further comprising the steps of:

after forming the electrical data path from the first to the second optical data paths, selecting a third and a fourth optical data path and forming a second electrical data path therebetween, and thereafter eliminating the electrical data path from the first to the second optical data paths without eliminating the second electrical data path between the third and fourth optical data paths.

35. The method of claim 3, wherein the electrical data path is created within a patch panel, and further comprising the steps of:

monitoring in the patch panel a system status;

reporting the system status.

36. The method of claim 35, wherein the system status includes one or more parameters selected from the group of errors and faults detected in the patch panel, temperature within the patch panel, and power supply status.

37. The method of claim 3, further comprising the steps of:

after forming the electrical data path from the first to the second optical data paths, selecting a third and a fourth optical data path and forming a second electrical data path therebetween, wherein the third and fourth optical data paths use a different wavelength of light than the first and second optical data paths.

38. The method of claim 3, further comprising the steps of:

after forming the electrical data path from the first to the second optical data paths, selecting a third and a fourth optical data path and forming a second electrical data path therebetween, wherein the third and fourth optical data paths use a different mode of optical transmission than the first and second optical data paths.

39. The method of claim 3, further comprising the steps of:

forming two or more additional electrical data paths between multiple additional pairs of optical data paths, whereby the multiple pairs of optical data paths provide for at least two of the network connections selected from the group of full-duplex point-to-point, loop, and multicasting.

40. The method of claim 3, wherein the electrical data path is created within a patch panel, and further comprising the steps of:

providing a graphical user interface to report at least one parameter selected from the group of errors and faults detected in the patch panel, temperature within the patch panel, and power supply status.

41. The system of claim 12 wherein the electronic circuitry is further controllable to form two or more electrical paths to convey the electrical signal from the optical receiver to two or more optical transmitters, so that the optical signal received by the optical input port is transmitted simultaneously through at least two optical output ports.

42. The system of claim 13 wherein the electronic circuitry is controllable to eliminate individual ones of the multiple electrical paths.

43. The system of claim 12 wherein the electronic circuitry monitors one or more parameters of system status, and reports an alarm if a parameter indicates an error in the system.

44. The system of claim 12 wherein each optical receiver is paired with one of the optical transmitters in a modular transceiver.

45. The system of claim 44 wherein the electronic circuitry includes a switch matrix with a plurality of electrical inputs and electrical outputs, each input connected to the electrical signal of one of the optical receivers, each output connected to the electrical input of one of the optical transmitters, the switch matrix forming the electrical path.

46. The system of claim 12 wherein the optical transmitters provide for regeneration of the optical signal to increase thereby the maximum transmission distance of the optical signal.

47. The system of claim 22, wherein the step of providing at least one patch panel includes providing a first patch panel and a second patch panel, wherein each patch panel includes an electrical input port adapted to receive and carry out control instructions from a remote administrator device and an electrical output port adapted to transmit control instructions, and further including the steps of:
connecting the electrical input port of the second patch panel to the electrical output port of the first patch panel;
connecting the electrical input port of the first patch panel to the remote administrator device; and
receiving a control instruction from the remote administrator device and transmitting the instruction to the second patch panel;
coupling in the second patch panel a first optical port to a second optical port in response to the control instruction.

48. The system of claim 22, wherein the at least one patch panel includes two or more electrical input ports, each adapted to receive and carry out control instructions from a remote administrator device, and further including the steps of:
connecting a first one of the electrical input ports of the patch panel to a first remote administrator device;
connecting a second one of the electrical input ports of the patch panel to a second remote administrator device; and
receiving control instructions from either one of the remote administrator devices to couple optical ports in response to the control instruction.

49. The system of claim 1 wherein all signals received from the incoming optical data path are transmitted to the outgoing fiber optic line for as long as the connection is maintained by the controller.

50. The system of claim 1 wherein the electrical signals contain the same information as contained in the optical signals.

51. The method of claim 3 wherein one of said selections is independent of the optical data signal.

52. The method of claim 3 wherein one of said selections is made by a user through a graphical user interface.

53. The method of claim 3 wherein one of said input and output optical port is adapted to transmit and receive signals.

54. An electronically-controllable fiber optic patch panel configured to replicate incoming fiber optic signals on an outgoing fiber optic line, comprising:
a switch matrix having plural electrical inputs and plural electrical outputs;
an electronic controller coupled to the switch matrix;
plural pairs of optical ports, each pair including a fiber optic input and a fiber optic output; and
plural transceivers, where each transceiver is connected to a different one of the plural pairs of optical ports and a different one of the plural electrical inputs and a different one of the plural electrical outputs, and where each transceiver includes
a receiver portion adapted to convert optical signals received at the corresponding fiber optic input into electrical signals, and to transmit the electrical signals to the corresponding electrical input, and
a transmitter portion adapted to convert electrical signals received from the corresponding electrical output into optical signals, and to transmit the optical signals to the corresponding fiber optic output;
where the switch matrix is adapted to be controlled by the controller to connect a selected electrical input to one or more selected electrical outputs before receiving an incoming signal and without decoding information contained in the incoming signal, so that optical signals received at the fiber optic input corresponding to the selected electrical input are transmitted to the one or more fiber optic outputs corresponding to the one or more selected electrical outputs, and where said controller receives instructions from a remote location.

55. The system of claim 54 wherein the system is adapted to be configured in a loop configuration.

56. A system for connecting an optical input to one or more selected optical outputs, comprising:
at least one optical input and output port;
at least one optical transceiver configured to receive an optical signal via the at least one optical input and output port, and configured to convert the optical signal into a corresponding electrical signal, wherein said at least one optical transceiver is further configured to receive electrical signals and convert the electrical signals into optical signals, and to transmit the optical signals to the at least one optical input and output port;
a plurality of optical output ports;
a plurality of optical transmitters, each coupled to a different one of the plurality of optical output ports, and each configured to selectively receive the corresponding electrical signal and convert it back to the optical signal for transmission through the optical output port;
electronic circuitry selectively controllable to form electrical paths to convey the corresponding electrical signal from the at least one optical transceiver to the optical transmitters coupled to multiple selected ones of the plurality of optical output ports, so that the optical signal received via the at least one optical input and output port is transmitted through the multiple selected ones of the plurality of optical output ports,
wherein the system is adapted to receive control instructions for forming said electrical paths, and where said control instructions are formed without determining destination addresses contained in the corresponding electrical signal.

57. The system of claim 56 wherein the system is adapted to be configured in a loop configuration.

58. An electronically-controllable fiber optic patch panel configured to replicate incoming fiber optic signals on an outgoing fiber optic line, comprising:
a switch matrix having plural electrical inputs and plural electrical outputs;
an electronic controller coupled to the switch matrix;
plural pairs of optical ports, each pair including a fiber optic input and a fiber optic output; and
plural transceivers, where each transceiver is connected to a different one of the plural pairs of optical ports and a different one of the plural electrical inputs and a different one of the plural electrical outputs, and where each transceiver includes a receiver portion adapted to convert optical signals received at the corresponding fiber optic input into electrical signals, and to transmit the electrical signals to the corresponding electrical input, and a transmitter portion adapted to convert electrical signals received from the corresponding electrical output into optical signals, and to transmit the optical signals to the corresponding fiber optic output;

where the switch matrix is adapted to be controlled by the controller via control instructions to connect a selected electrical input to one or more selected electrical outputs, so that optical signals received at the fiber optic input corresponding to the selected electrical input are transmitted to the one or more fiber optic outputs corresponding to the one or more selected electrical outputs, where said controller receives said control instructions separately from the optical signals and corresponding electrical signals, and independent of any communication protocols in the electrical signals.

59. The electronically-controllable fiber optic patch panel of claim 58 wherein the electronically-controllable fiber optic patch panel is adapted to be configured in a loop configuration.

60. A system for connecting an optical input to one or more selected optical outputs, comprising:

at least one optical input and output port;

at least one optical transceiver configured to receive an optical signal via the at least one optical input and output port, and configured to convert the optical signal into a corresponding electrical signal, wherein said at least one optical transceiver is further configured to receive electrical signals and convert the electrical signals into optical signals, and to transmit the optical signals to the at least one optical input and output port;

a plurality of optical output ports;

a plurality of optical transmitters, each coupled to a different one of the plurality of optical output ports, and each configured to selectively receive the corrresponding electrical signal and convert it back to the optical signal for transmission through the optical output port;

electronic circuitry selectively controllable to form electrical paths to convey the corresponding electrical signal from the at least one optical transceiver to the optical transmitters coupled to multiple selected ones of the plurality of optical output ports, so that the optical signal received via the at least one optical input and output port is transmitted through the multiple selected ones of the plurality of optical output ports, wherein the system is adapted to receive control instructions for forming said electrical paths, and where said control instructions are formed without decoding, interpreting, or changing information contained in the optical signal and corresponding electrical signal.

61. The system of claim 60 wherein the system is adapted to be configured in a loop configuration.

\* \* \* \* \*